(12) United States Patent
Huynh

(10) Patent No.: US 11,198,502 B2
(45) Date of Patent: Dec. 14, 2021

(54) METHODS AND APPARATUS FOR REDUNDANT ACTUATION OF CONTROL SURFACES

(71) Applicant: The Boeing Company, Chicago, IL (US)

(72) Inventor: Neal Van Huynh, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 16/577,654

(22) Filed: Sep. 20, 2019

(65) Prior Publication Data

US 2021/0086889 A1    Mar. 25, 2021

(51) Int. Cl.
*B64C 13/34* (2006.01)
*B64C 9/02* (2006.01)
*B64C 13/36* (2006.01)

(52) U.S. Cl.
CPC ............... *B64C 13/34* (2013.01); *B64C 9/02* (2013.01); *B64C 13/36* (2013.01)

(58) Field of Classification Search
CPC ......... B64C 13/34; B64C 13/36; B64C 13/30; B64C 13/40; B64C 13/504; B64C 9/02
See application file for complete search history.

(56) References Cited

U.S. PATENT DOCUMENTS

| | | | |
|---|---|---|---|
| 6,799,739 B1 | 10/2004 | Jones | |
| 10,829,203 B2 * | 11/2020 | Huynh | B64C 13/40 |
| 10,926,867 B2 * | 2/2021 | Huynh | B64C 13/505 |
| 2005/0029407 A1 * | 2/2005 | Pohl | B64C 13/24 244/221 |
| 2011/0062282 A1 * | 3/2011 | Richter | B64C 13/505 244/99.4 |
| 2020/0070959 A1 * | 3/2020 | Huynh | B64C 13/505 |

OTHER PUBLICATIONS

Peter K.C. Rudolph, "High-Lift Systems on Commercial Subsonic Airliners," NASA Contractor Report 4746, p. 21, Sep. 1996, Ames Research Center, Moffett Field, CA, 166 pages.

* cited by examiner

*Primary Examiner* — Rodney A Bonnette
(74) *Attorney, Agent, or Firm* — Hanley, Flight & Zimmerman, LLC

(57) ABSTRACT

Methods, apparatus, systems and articles of manufacture are disclosed for redundant actuation of control surfaces. An example apparatus includes a control surface of an aircraft, and an actuator to move the control surface. The example apparatus also includes an electric motor to move the actuator; the electric motor communicatively coupled to an electrical system of the aircraft. The example apparatus also includes a hydraulic motor to move the actuator, the hydraulic motor fluidly coupled to a hydraulic system of the aircraft. The example apparatus also includes a sensor to detect incorrect operation of the hydraulic system. The example apparatus also includes a switch operatively coupled to the sensor, the switch to enable operation of the electric motor in response to the detected incorrect operation of the hydraulic system.

20 Claims, 13 Drawing Sheets

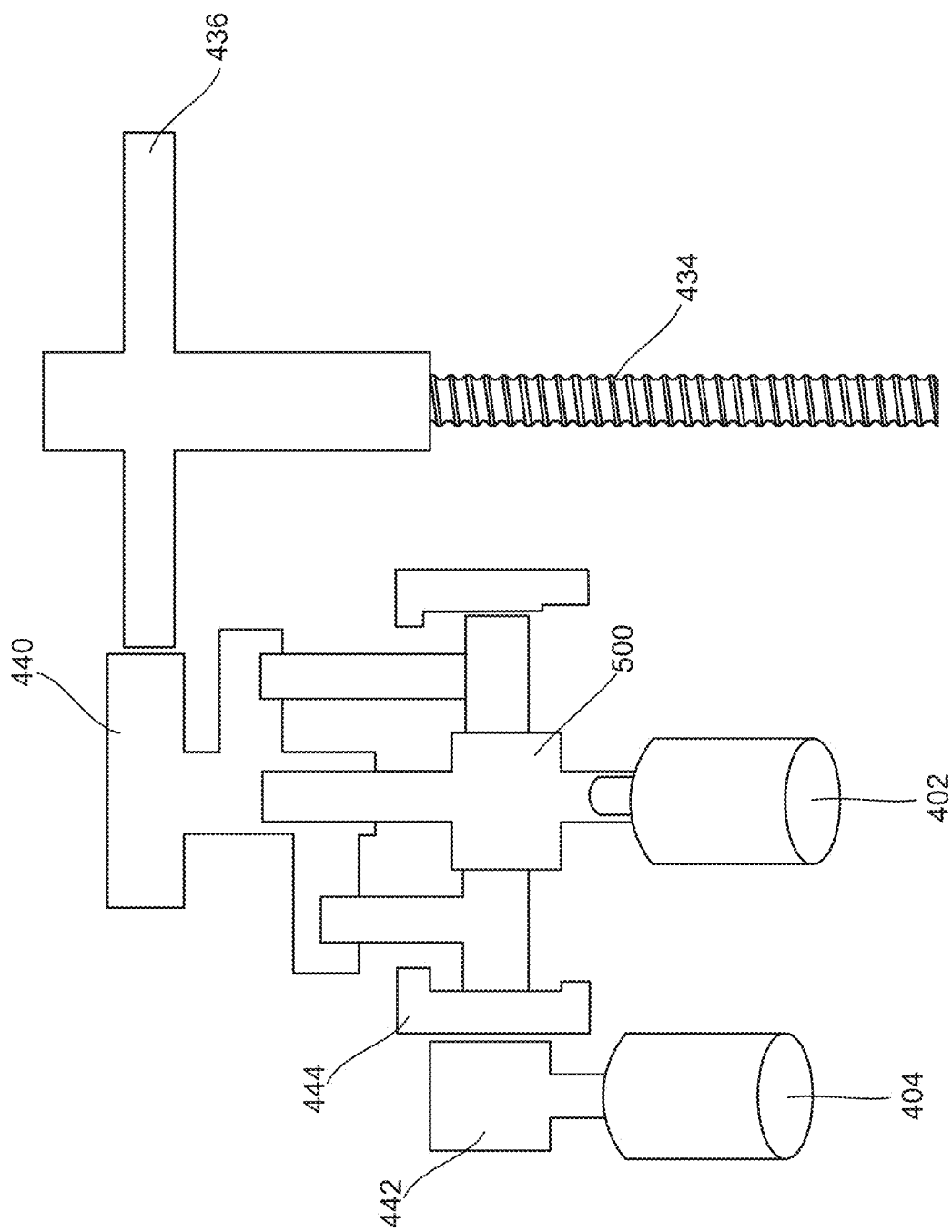

METHODS AND APPARATUS FOR REDUNDANT ACTUATION OF CONTROL SURFACES

FIELD OF THE DISCLOSURE

This disclosure relates generally to aircraft and, more specifically, to methods and apparatus for redundant actuation of control surfaces.

BACKGROUND

Aircraft (e.g., commercial aircraft) typically include control surfaces, such as flaps (e.g., outboard flaps and/or inboard flaps), that are movable and deflected between multiple positions (e.g., between retracted and deployed positions). For example, moving the control surface of a wing of an aircraft during flight can vary a lift characteristic associated with the aircraft wings.

SUMMARY

Methods, apparatus, systems and articles of manufacture are disclosed for redundant actuation of control surfaces. In some examples, an apparatus is disclosed. In some disclosed examples, the apparatus comprises a control surface of an aircraft. In some disclosed examples, the apparatus comprises an actuator to move the control surface. In some disclosed examples, the apparatus comprises an electric motor to move the actuator, the electric motor communicatively coupled to an electrical system of the aircraft. In some disclosed examples, the apparatus comprises a hydraulic motor to move the actuator, the hydraulic motor fluidly coupled to a hydraulic system of the aircraft. In some disclosed examples, the apparatus comprises a sensor to detect incorrect operation of the hydraulic system. In some disclosed examples, the apparatus comprises a switch operatively coupled to the sensor, the switch to enable operation of the electric motor in response to the detected incorrect operation of the hydraulic system.

In some examples, a method is disclosed. In some disclosed examples, the method comprises moving a control surface of an aircraft via a hydraulic motor, the hydraulic motor fluidly coupled to a hydraulic system of the aircraft. In some disclosed examples, the method comprises detecting incorrect operation of the hydraulic system via a sensor. In some disclosed examples, the method comprises switching, via a switch, operation of the control surface from the hydraulic motor to an electric motor in response to detecting the incorrect operation of the hydraulic system, the electric motor communicatively coupled to an electrical system of the aircraft.

In some examples, a system is disclosed. In some disclosed examples, the system comprises a control system coupled to an actuator, a first driver coupled to the control system to selectively drive the actuator, and a second driver coupled to the control system to selectively drive the actuator, where the control system is coupled to the first driver and the second driver and is configured to select operation of the second driver upon determination of improper operation of the first driver.

In some examples, a non-transitory computer readable medium is disclosed. In some examples, the non-transitory computer readable medium comprises instructions, that, when executed, cause a processor to move a control surface of an aircraft via a hydraulic motor, the hydraulic motor fluidly coupled to a hydraulic system of the aircraft. In some disclosed examples, the non-transitory computer readable medium comprises instructions, that, when executed, cause a processor to detect incorrect operation of the hydraulic system via a sensor. In some disclosed examples, the non-transitory computer readable medium comprises instructions, that, when executed, cause a processor to switch operation of the control surface from the hydraulic motor to an electric motor in response to detecting the incorrect operation of the hydraulic system, the electric motor communicatively coupled to an electrical system of the aircraft.

BRIEF DESCRIPTION OF THE DRAWINGS

FIG. 5 is a detailed view of a portion of an actuator of the control surface actuation system of FIG. 3.

Figure 1:
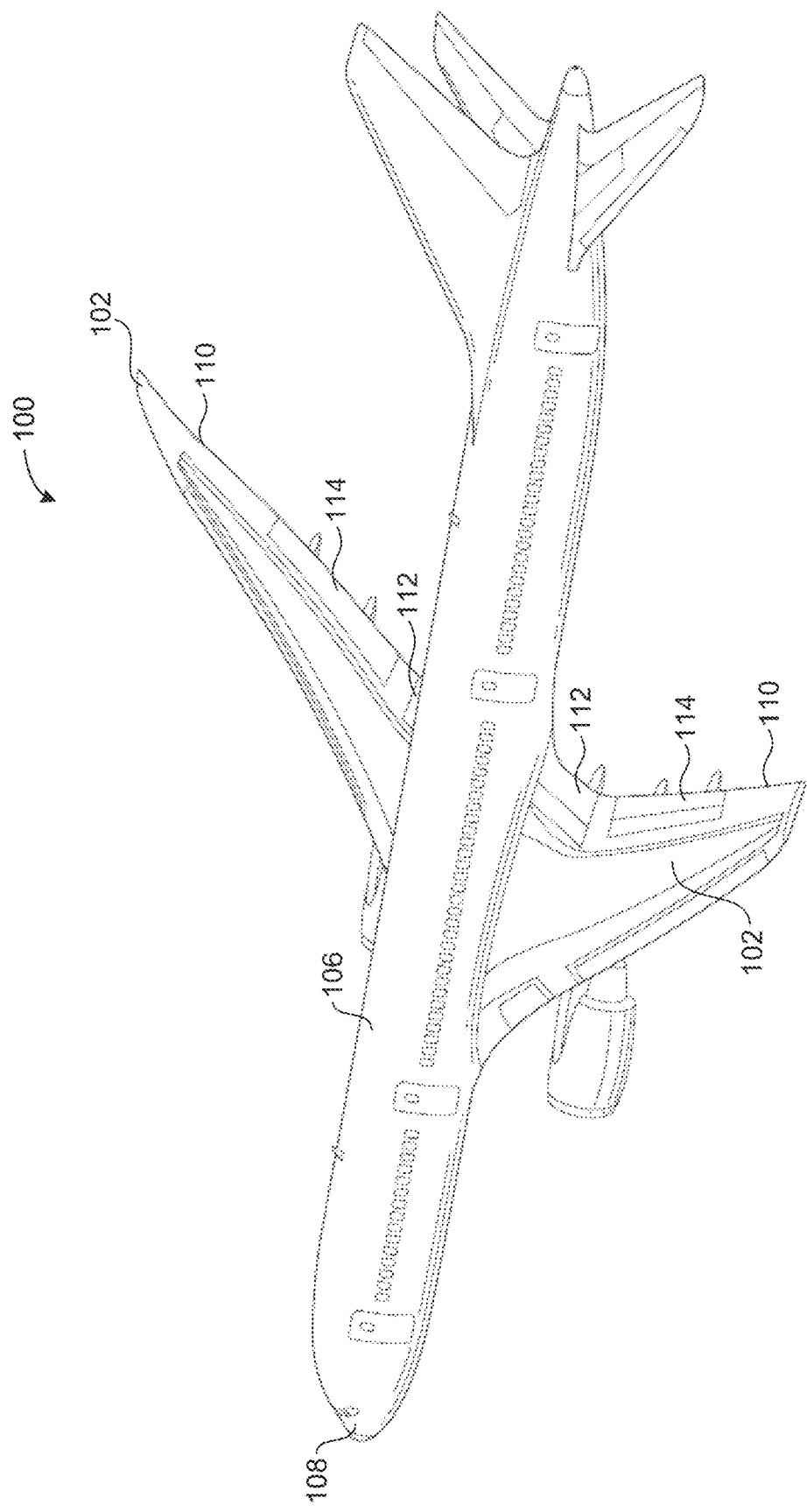
FIG. 1 illustrates an example aircraft in which examples disclosed herein can be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus for redundant actuation of control surfaces are disclosed. Control surfaces, such as flaps of an aircraft (e.g., outboard flaps and/or inboard flaps of the aircraft) can be located at and/or along a respective fixed trailing edge of a wing of the aircraft. Some known trailing edge wing flap systems include actuators and/or ball screws arranged to move the flaps relative to the fixed trailing edges of the aircraft wings between retracted and deployed positions. In such known trailing edge wing flap systems, the actuators are connected to a power drive unit via torque tubes, of which the system hardware occupies a significant amount of space behind the wing rear spar where hardware associated with other airplane systems can also be located. Thus, the spatial integration of such hardware in a thin wing aircraft can sometimes necessitate a large wing fairing. However, a large wing fairing creates can cause a significant amount of aerodynamic drag. Additionally, the known trailing edge system also typically implement multiple sub-assemblies (e.g., torque tubes, couplings, angle bear boxes, universal joints, and ball screws, etc.), all of which require significant labor installation hours. Accordingly, a Distributed Trailing Edge (DTE) wing flap system can be implement address the aforementioned drawbacks. However, in comparison to conventional trailing edge wing flap system, the DTE system architecture has actuators acting independently and in parallel at respective flap surfaces. Therefore, such DTE system architectures can necessitate a level of redundancy and fault tolerance to meet requirements.

In contrast, examples disclosed herein utilize redundant actuation of actuators that act independently, in parallel, and move a respective control surface. Some examples disclosed herein include actuators, which are hydraulically and electrically driven (e.g., driven via an electrical system of the aircraft). When driven by the electrical system, an actuator can be operated independent of a hydraulic system by which the actuator is typically driven. In particular, a switch is implemented to enable hydraulic or electrical operation of the actuator. As a result, the actuator can be moved via a respective electric motor when the hydraulic system is inoperable and/or malfunctioning and, thus, an ability of the aircraft to change and/or control a position of a control surface can be restored (e.g., a wing flap can be actuated to the last commanded position, or to a newly indicated position of the wing flap following a malfunction of the hydraulic system).

In some examples, actuators may be implemented by and/or integrated onto an aircraft with a fly-by-wire flight control system. Additionally or alternatively, the actuators can be controlled by a power architecture including a hydraulic system along with an electrical system. In some such examples, the electrical system of the aircraft may be powered at a relatively low voltage (e.g., 115 VAC or 28 VDC).

As used herein, the term "switch" refers to a mechanical and/or electrical device, component, software implementation, and/or assembly that enables a change in a mode of operation of a device coupled thereto. As used herein, the term "motor" refers to a device, component, and/or assembly used to convert energy (e.g., electrical energy, fluid/pressure energy, etc.) into motion. Accordingly, the term "electric motor" refers to an electrically operated motor while the term "hydraulic motor" refers to a hydraulically operated motor.

FIG. 1 illustrates an example aircraft 100 in which examples disclosed herein can be implemented. Examples disclosed herein can be implemented on commercial aircraft (e.g., the aircraft 100 of FIG. 1), as well as other types of aircraft (e.g., military aircraft, unmanned aerial vehicles, etc.). The aircraft 100 of FIG. 1 includes example wings 102, an example fuselage 106, and an example cockpit area 108. The wings 102 each include an example first fixed trailing edge 110, an example inboard flap 112, and an example outboard flap 114. The inboard flap 112 and the outboard flap 114 are respectively located at and/or along the first fixed trailing edge 110 of the wing 102.

In the illustrated example of FIG. 1, the inboard flap 112 and the outboard flap 114 are shown in respective retracted positions (e.g., neutral positions) relative to the respective fixed trailing edges 110 of the wings 102. The inboard flaps 112 and the outboard flaps 114 are movable and/or actuatable between the respective retracted positions shown in FIG. 1 and respective deployed positions in which the inboard flaps 112 and the outboard flaps 114 are extended rearward and/or downward from the fixed trailing edges 110 of the wings 102. In some examples, respective ones of the wing flaps (e.g., the inboard flap 112 and/or the outboard flap 114) can be movable and/or actuatable to a variety of deployed positions corresponding to desired and/or commanded detents of the flaps (e.g., flaps thirty (F30), flaps forty (F40), etc.).

In some examples, respective ones of the wing flaps (e.g., the inboard flap 112 and/or the outboard flap 114) may be movable and/or actuatable between a retracted position and a deployed position via one or more actuator(s) (e.g., one or more hydraulic linear actuator(s), one or more hydraulic rotary actuator(s), etc.).

Figure 2A:
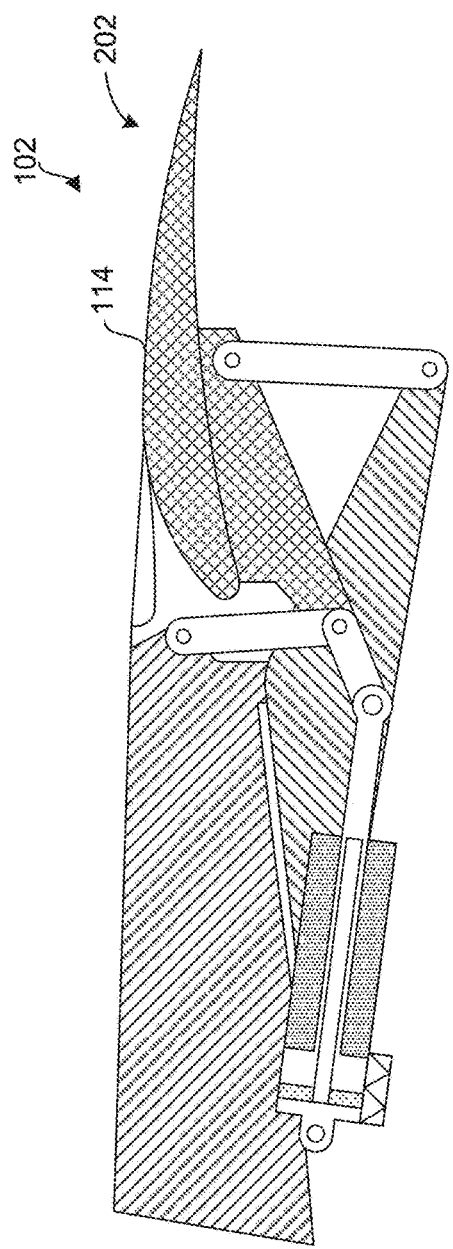
FIG. 2A is a cross-sectional view of a portion of a wing of the aircraft of FIG. 1 in which an example outboard flap is depicted in a retracted position.

FIG. 2A is a cross-sectional view of a portion of the wing 102. In the illustrated view, the example outboard flap 114 is depicted in a retracted position 202. In other words, the outboard flap 114 is not angled from its neutral position (e.g., 0 degrees).

Figure 2B:
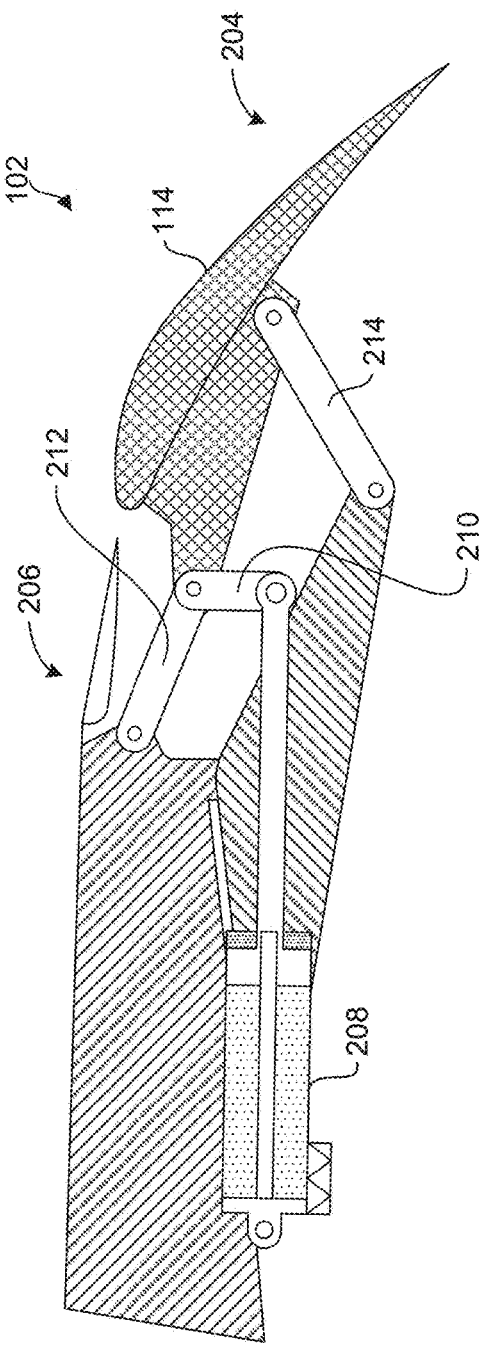
FIG. 2B is a cross-sectional view of the example outboard flap of the example wing of FIG. 1 in a deployed position.

FIG. 2B is a cross-sectional view of a portion of the wing 102. In this example, the outboard flap 114 is depicted in a deployed position 204. In the illustrated example, the outboard flap 114 is coupled to the wing 102 via an example linkage assembly 206. In this example, the outboard flap 114 is movable between the retracted position 202 of FIG. 2A and the deployed position 204 of FIG. 2B via an example actuator 208. The example linkage assembly 206 includes a first link 210, a second link 212, and a third link 214. In the illustrated example, the first link 210 extends between an output of the actuator 208 and the second link 212. Further, the second link 212 extends between the first link 210 and the outboard flap 114, and the third link 214 extends between the wing 102 to the first outboard flap 114. In other examples, the configuration and/or arrangement of the first link 210, the second link 212, and/or the third link 214 may differ from that shown in relation to the example linkage assembly 206 depicted in FIGS. 2A and 2B. In still other examples, the linkage assembly 206 of FIGS. 2A and 2B may include additional (e.g., a fourth, a fifth, a sixth, etc.) links beyond the first, second and third links 210, 212, 214 described above. Furthermore, while only a single linkage assembly and a single actuator are shown in the example of FIGS. 2A and 2B, additional (e.g., a second, a third, a fourth, etc.) linkage assemblies and corresponding additional actuators may also be implemented relative to the first outboard flap 114 and the wing 102 to control and/or facilitate movement of the outboard flap 114 between the retracted position 202 of FIG. 2A and the deployed position 204 of FIG. 2B.

In the illustrated example of FIGS. 1, 2A and 2B, each actuator (e.g., the actuator 208) may be powered, controlled, and/or operated via a corresponding hydraulic module operatively coupled thereto. The hydraulic module may be powered, controlled, and/or operated via a corresponding remote electronics unit (REU) operatively coupled to the hydraulic module. In some examples, the REU is powered, controlled, and/or operated via one or more flight control electronics unit(s) (FCEU) operatively coupled to the REU, or one or more actuation control electronics (ACE) (e.g., an actuator driver, a driver, etc.) operatively coupled to the REU. The one or more FCEU(s) or ACE(s) may be controlled and/or operated based on one or more input(s) received from a flap lever and/or a pilot control inceptor operatively coupled to the FCEU(s) or ACE(s) and located in the cockpit area 108 of the aircraft 100.

Figure 3:
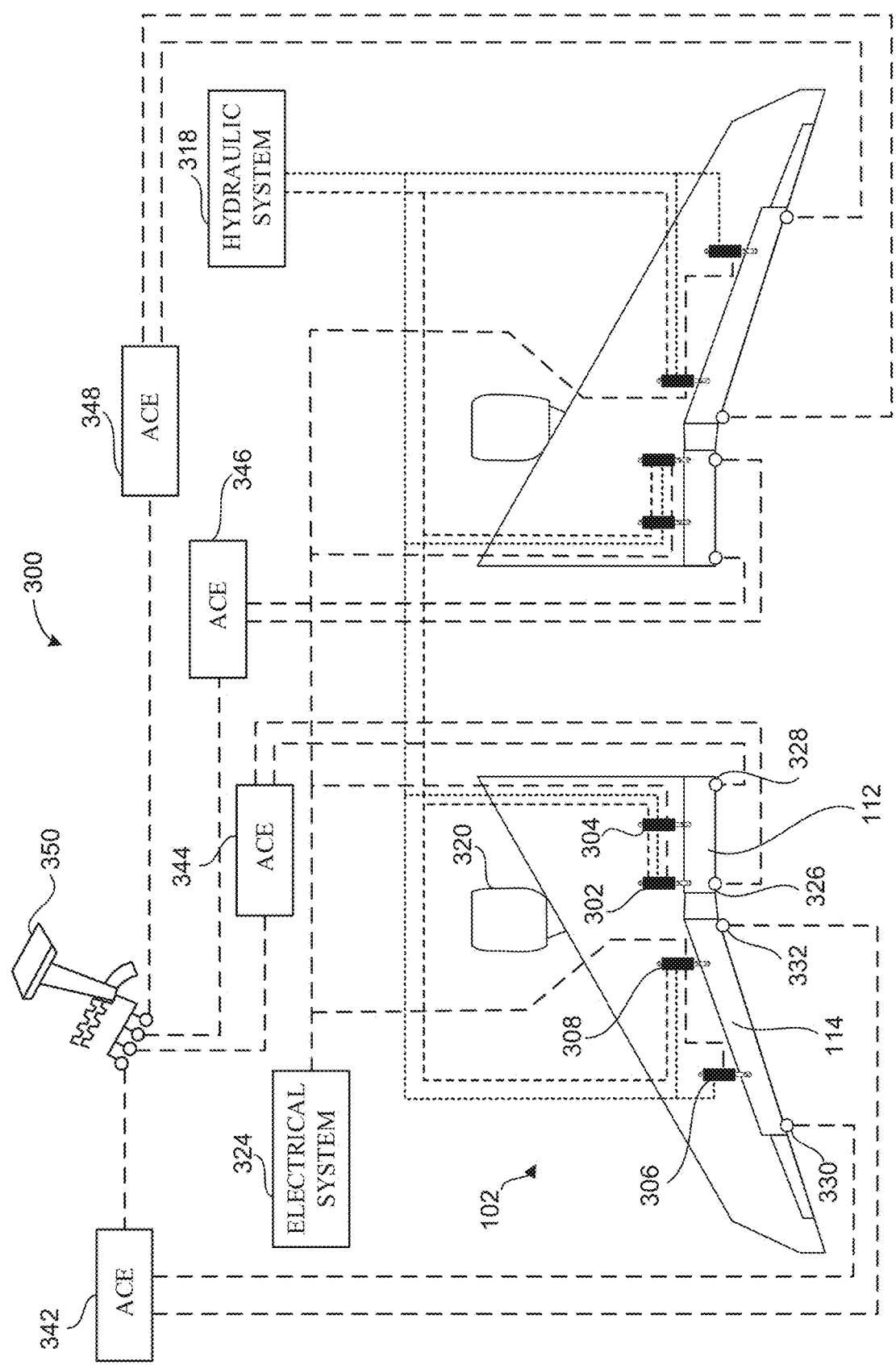
FIG. 3 is a schematic overview of an example control surface actuation system constructed in accordance with teachings of this disclosure.

FIG. 3 is a schematic overview of an example control surface actuation system 300 constructed in accordance with teachings of this disclosure. The example control surface actuation system 300 of FIG. 3 can be implemented in the example aircraft 100 of FIG. 1 described above. In the illustrated example of FIG. 3, the control surface actuation system 300 includes the wing 102, the inboard flap 112, and the outboard flap 114 of FIG. 1 described above.

The control surface actuation system 300 of the illustrated example also includes an example first actuator 302, an example second actuator 304, an example third actuator 306 and an example fourth actuator 308. In this example, the first actuator 302 and the second actuator 304 are respectively operatively coupled to the inboard flap 112 and to the wing 102. The third actuator 306 and the fourth actuator 308 are respectively operatively coupled to the outboard flap 114 and to the wing 102.

In operation, the first, second, third, and fourth actuators 302, 304, 306, 308, move and/or actuate correspondingly coupled ones of the inboard flap 112, and the outboard flap 114 between a respective retracted position and a respective deployed position. For example, the first actuator 302 and the second actuator 304 move and/or actuate the inboard flap 112 between a retracted position (as shown in FIG. 3) and a deployed position relative the fixed trailing edge 110 of the wing 102. The third actuator 306 and the fourth actuator 308 move and/or actuate the outboard flap 114 between a retracted position (as shown in FIG. 3) and a deployed position relative the fixed trailing edge 110 of the wing 102.

Although not visible in FIG. 3, the first, second, third and fourth actuators 302, 304, 306, 308 include respective actuator position feedback sensors to sense, measure and/or detect a position thereof. In some examples, the measured position of the actuator detected by the actuator position feedback sensor may correspond to and/or indicate a position (e.g., a retracted position, a deployed position, etc.) of a corresponding wing flap to which the actuator is coupled. An actuator position feedback sensor that may be included in and/or implemented by the first, second, third, or fourth actuators 302, 304, 306, 308 of FIG. 3 is further described below in connection with FIG. 4.

The control surface actuation system 300 of FIG. 3 also includes an example hydraulic system 318, which may be powered by an example engine 320. In particular, the engine 320 is coupled to the wing 102 and powers the hydraulic system 318 to supply pressurized hydraulic fluid to respective ones of the first, second, third, and fourth actuators 302, 304, 306, 308.

The control surface actuation system 300 of FIG. 3 also includes an example electrical system 324, which may be powered by the engine 320. In the illustrated example of FIG. 3, the engine 320 is coupled to the first wing 102 and the engine 320 supplies power to the electrical system 324. The electrical system 324 (including the electrical power supplied and/or delivered thereby) is selectively couplable to the first, second, third, and fourth actuators 302, 304, 306, 308.

The control surface actuation system 300 of FIG. 3 also includes a first example flap position sensor 326, a second example flap position sensor 328, a third example flap position sensor 330, and a fourth example flap position sensor 332. In the illustrated example of FIG. 3, the first flap position sensor 326 and the second flap position sensor 328 are respectively coupled to the inboard flap 112 of the wing 102. Similarly, the third flap position sensor 330 and the fourth flap position sensor 332 are respectively coupled to the outboard flap 114 of the wing 102. Respective ones of the first, second, third, and fourth flap position sensors 326, 328, 330, 332 sense, measure and/or detect a position of a corresponding one of the inboard flap 112, and/or the outboard flap 114. For example, the first flap position sensor 326 and the second flap position sensor 328 can respectively sense, measure and/or detect a position of the inboard flap 112. In some examples, the first and second flap position sensors 326 and 328 measure or detect a skew or mismatch between the inboard flap 112 and the outboard flap 114. In some examples, the first and second flap position sensors 326 and 328 measure or detect an asymmetry between a left wing's inboard flap 112 of a left wing and a corresponding inboard flap 112 of a right wing, for example.

The control surface actuation system 300 of FIG. 3 also includes a first example ACE 342, a second example ACE 344, a third example ACE 346, a fourth example ACE 348, and an example flap lever (e.g., a flap control lever) 350. In some examples, the first ACE 342, and the second ACE 344 may be located within the forward end of the fuselage 106 of the aircraft 100, and the flap lever 350 can be located in the cockpit area 108 of the aircraft 100. Similarly the third ACE 346 and the fourth ACE 348 may be located within the aft end of the fuselage 106. This arrangement can relieve any spatial integration issues when most or all system electronics are generally located at a single location. In this example, the first ACE 342 and the second ACE 344 are respectively controlled and/or operated based on one or more input(s) received from the flap lever 350. In some examples, the position of the flap lever 350 can correspond to and/or otherwise be associated with a desired and/or commanded position and/or detent (e.g., flaps retracted, flaps extended, flaps thirty (F30), flaps forty (F40), etc.) of the inboard flap 112 and/or the outboard flap 114. In the illustrated example of FIG. 3, the first ACE 342 and the second ACE 344 are operatively coupled to (e.g., in electrical communication with) at least one of the first, second, third, and fourth flap position sensors 326, 328, 330, 332.

Figure 4A:
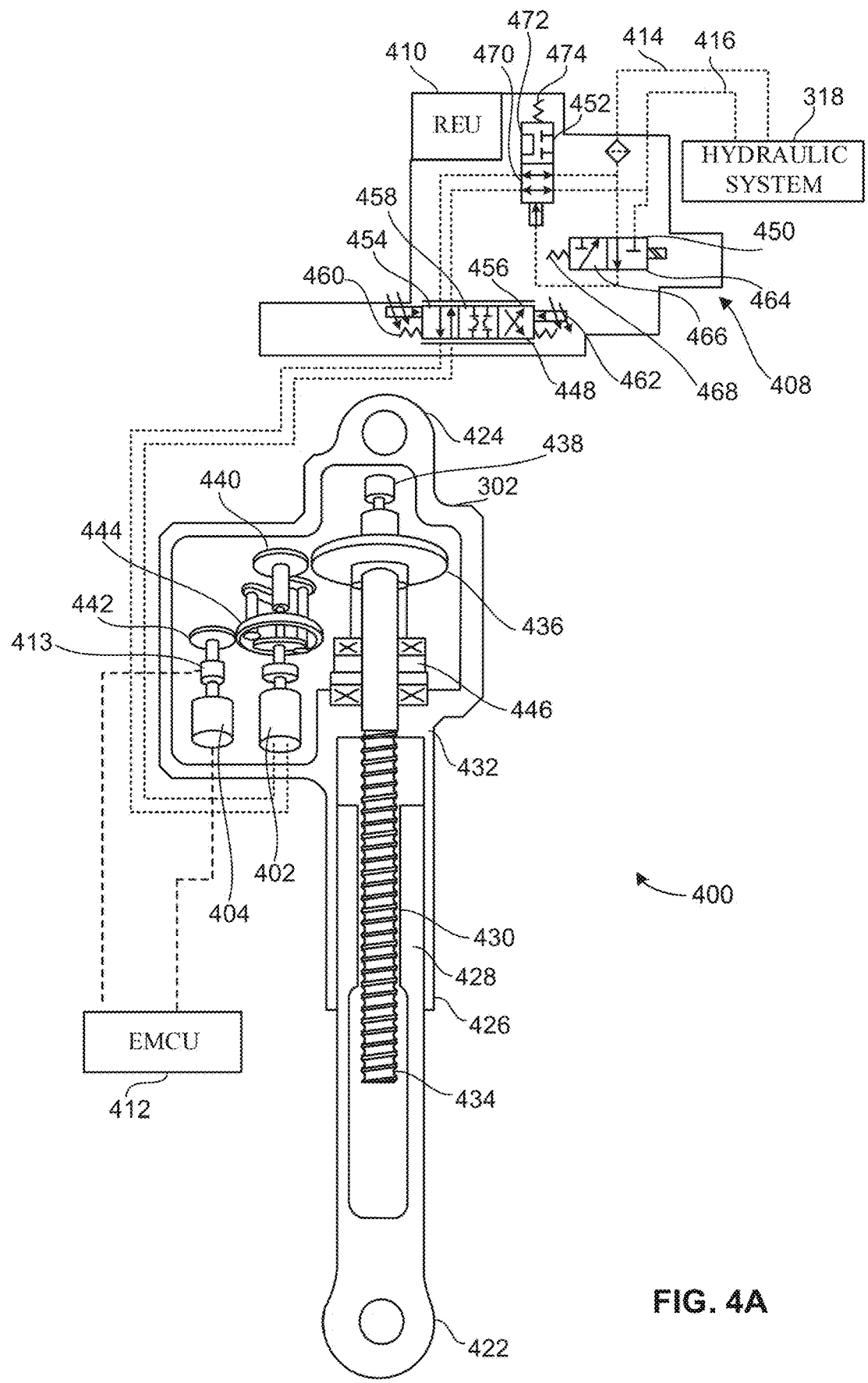
FIG. 4A-4B are schematic overviews of portions of the example control surface actuation system of FIG. 3.
Figure 4B:
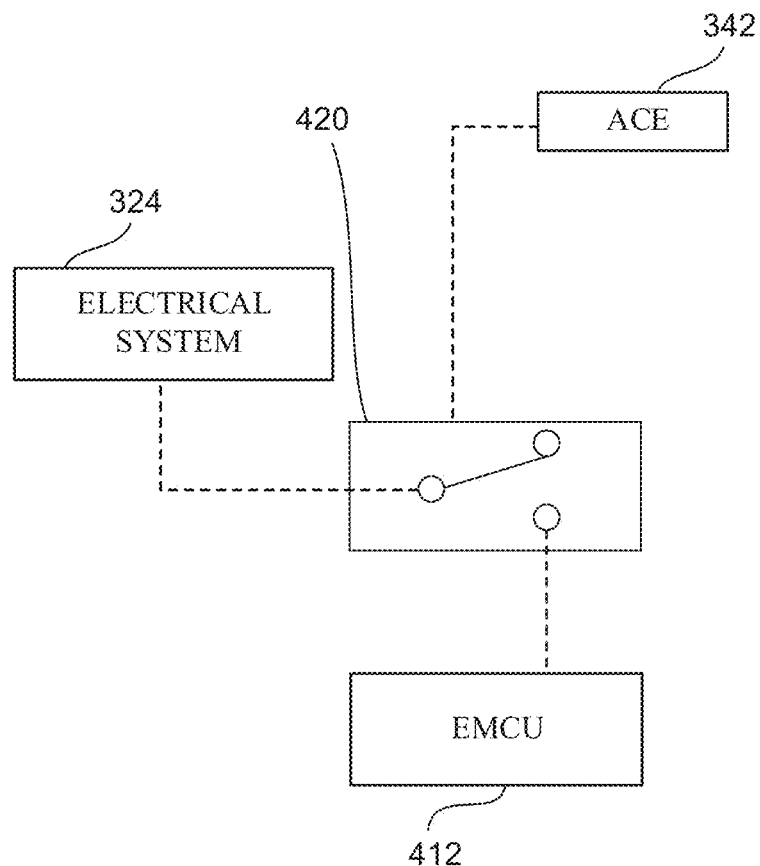

In the illustrated example of FIGS. 3, 4A, and 4B, the first ACE 342, and the second ACE 344, control respective REU 410 and EMCU 412 of corresponding ones of the first, second, third, and fourth actuators 302, 304, 306, 308. The ACEs 342, 344, 346, 348 determine the actuation power and control either the REU 410 or the EMCU 412 to all of the first, second, third, and fourth, actuators 302, 304, 306, 308. In some examples, the first ACE 342 and the second ACE 344 can actuate the aforementioned switches of the first, second, third, and fourth, actuators 302, 304, 306, 308 to a closed position in response to a detected malfunction (e.g., a loss or reduction of pressurized hydraulic fluid) of the hydraulic system 318. In some examples, the third ACE 346, and the fourth ACE 348 can actuate switches of the actuators on a symmetrical wing (e.g., a corresponding wing on the opposite side of the fuselage 106) of the aircraft 100 to a closed position in response to a detected malfunction (e.g., a loss or reduction of pressurized hydraulic fluid) of the hydraulic system 318.

FIGS. 4A-4B illustrate an overview of a portion 400 of the example control surface actuation system 300 of FIG. 3. The example portion 400 includes the hydraulic system 318, the electrical system 324, the first ACE 342, and the second ACE 344. The portion 400 further includes an example hydraulic motor 402, an example electric motor 404, an example Hydraulic Control Module (HCM) 408, an example remote electronics unit (REU) 410, and an example electronic motor control unit (EMCU) 412. The portion 400 shown in FIGS. 4A-4B is representative of the structures and operative couplings that can be implemented with any one of the inboard flap 112 or the outboard flap 114, or any other appropriate aerodynamic structure.

In the illustrated example of FIG. 4A, the hydraulic motor 402, the electric motor 404, the hydraulic module 408, the REU 410, and the EMCU 412 of FIG. 4B can correspond to the inboard flap 112. In another example, the hydraulic motor 402, the electric motor 404, the hydraulic module 408, the REU 410, and the EMCU 412 of FIG. 4B can correspond to the outboard flap 114. In yet another example, the hydraulic motor 402, the electric motor 404, the hydraulic module 408, the REU 410, and the EMCU 412 of FIG. 4B can correspond to the inboard flap 112 or the outboard flap 114.

In the illustrated example of FIG. 4A, the hydraulic module 408 is operatively coupled to (e.g., in fluid communication with) the hydraulic system 318 and the actuator 302. In this example, the REU 410 is operatively coupled to (e.g., in electrical communication with) the hydraulic module 408 and the hydraulic system 318 is operatively coupled to (e.g., in fluid communication with) the hydraulic module 408 via an example supply line 414 and an example return line 416. In some examples, the REU 410 can be located at a location remote from the HCM 408. The example EMCU 412 of FIG. 4A is operatively coupled to (e.g., in electrical communication with) the electric motor 404 and an electric brake 413. The electrical system 324 of the illustrated example is selectively operatively coupled to (e.g., selectively in electrical communication with) the electric motor 404 via the switch 420 of the EMCU 412.

In the illustrated example of FIG. 4A, the example actuator 302 includes a first end 422, a second end 424 opposite the first end 422, a cylinder 426, a piston 428, a ball nut 430, a case or housing 432, a screw 434, a gear 436, and an actuator position feedback sensor 438. The first end 422 can be coupled to a linkage assembly (e.g., the linkage assembly 206 of FIGS. 2A-2B) of a wing flap (e.g., the inboard flap 112, the outboard flap 114 of FIGS. 1 and 3), and the second end 424 can be coupled to a corresponding wing structure (e.g., the wing 102 of FIGS. 1 and 3). In this example, the cylinder 426, the piston 428, the ball nut 430, the case 432, and the screw 434 have respective fixed lengths, and the piston 428 is positioned, disposed, and/or received within the cylinder 426. The example piston 428 is movable and/or slidable relative to the cylinder 426 between a retracted position and an extended position. In some examples, the actuator 302 has a first length when the piston 428 is in the retracted position relative to the cylinder 426, and a second length greater than the first length when the piston 428 is in the extended position relative to the cylinder 426. In this example, the piston 428 and the ball nut 430 are coupled to one another and/or integrally formed such that the piston 428 and the ball nut 430 move together relative to the cylinder 426.

To move the screw 434, the gear 436, which can be coupled to and/or integrally formed with the screw 434, engages an output gear 440 of the hydraulic motor 402, and the output gear 440, in turn, engages the gear 436 to cause movement of the screw 434. In the illustrated example, the hydraulic motor 402 rotates the output gear 440 and, in turn, rotates the gear 436 to cause linear displacement of the actuator 302. However, in some examples where the hydraulic motor 402 of one of the eight actuators is not operating normally (e.g., due to a malfunction), the electric motors 404 and electric brakes 413 in eight actuators are activated such that all eight actuators are actuated.

In the illustrated example, the actuator position feedback sensor 438 is coupled to and/or mounted on the screw 434. In operation, the actuator position feedback sensor 438 senses, measures and/or detects a position of the screw 434 (e.g., a rotational position of the screw 434 relative to a fixed end of the actuator 426), and/or a relative position of a movable end of the piston 428 (e.g., a translational displacement of the movable end of the piston 428 relative to the fixed end of the actuator 426). The actuator position feedback sensor 438 is operatively coupled to (e.g., in electrical communication with) the REU 410 and EMCU 412 such that either one can receive and/or obtain actuator position feedback data from the actuator position feedback sensor 438. In turn, the actuator position feedback data obtained by the REU 410 and EMCU 412 is conveyed to the first ACE 342.

The actuator 302 can be actuated by either of two independent aircraft power source types. First, the actuator 302 can be actuated via the hydraulic system 318 when the hydraulic system 318 is operational, functional, and/or active. As such, the hydraulic motor 402 functions to operate the actuator 302 during normal operation. Second, in the event of a malfunction of the hydraulic system 318 and/or the hydraulic module 408, the actuator 302 can, alternatively, be actuated and/or controlled via the electrical system 324 using the EMCU 412 and, thus, the electric motor 404 operates the actuator 302 via the ring gear 444.

To maintain the position of the actuator 302 during a transition between control by the hydraulic system 318 and the electrical system 324, the actuator 302 includes a no-back (e.g., a directional movement restrictor) 446, which restricts the actuator 302 into a locked position to maintain the aircraft in a stable flight position.

In the illustrated view of FIG. 4A, the example HCM 408 is in a first example operational mode such that the HCM 408 can selectively place the supply line 414 of the hydraulic system 318 in fluid communication with hydraulic motor 402 to provide pressurized hydraulic fluid thereto. In the illustrated view of FIG. 4A the example REU 410 includes one or more processor(s) to control and/or manage loop closure, malfunction detection, and/or actuation control commands associated with electro-hydraulic elements inside the HCM 408.

The example HCM 408 includes a plurality of control valves. In some examples, one or more of the control valves can be hydraulically actuated (e.g., via pressurized hydraulic fluid supplied via the supply line 414). Additionally or alternatively, one or more of the control valves can be electrically actuated (e.g., via the REU 410). The control valves of the HCM 408 control and/or manage the routing and/or distribution of pressurized hydraulic fluid from the supply line 414 to the hydraulic motor 402 and, additionally, from the hydraulic motor 402 to the return line 416. In the illustrated example, the HCM 408 includes an example electrohydraulic servo valve (EHSV) 448, an example solenoid valve (SOV) 450, and an example mode selector valve (MSV) 452.

The example EHSV 448 is a four-way flow-control valve that controls an amount of flow based on input current. The EHSV 448 has three control ports that are movable and/or actuatable between an example first control port position 454 (e.g., a flap deployment flow position), an example second control port position 456 (e.g., a flap retraction flow position), and an example third control port position 458 (e.g., a null region). The example EHSV 448 includes and/or is coupled to a first bias spring 460 and a linear variable differential transformer (LVDT) 462. In this example, the first bias spring 460 biases the EHSV 448 into and/or toward the first control port position 454 of the EHSV 448 and the LVDT 462 senses, measures and/or detects a position of the EHSV 448. In the illustrated example, the EHSV 448 is operatively coupled to (e.g., in electrical communication with) the REU 410. The example REU 410 selectively positions the EHSV 448 in one of the first, second, or third control port positions 454, 456, 458. For example, the REU 410 can energize the EHSV 448 to move from the first control port position 454 into the second control port position 456 over the bias generated by the first bias spring 460. In some examples, the REU 410 transmits a control signal to the EHSV 448 to control the position of the EHSV 448. Additionally or alternatively, the REU 410 receives an electrical signal from an actuator position feedback sensor (e.g., the actuator position feedback sensor 438) associated with the REU 410 and/or the hydraulic module 408.

The SOV 450 of the illustrated example is a two-position valve having control ports that are movable and/or actuatable between an example first control port position 464 (e.g., a normal flow position) and an example second control port position 466 (e.g., a diverted flow position). The SOV 450 includes and/or is coupled to an example second bias spring 468. In some examples, the second bias spring 468 biases the SOV 450 into and/or toward the second control port position 466 of the SOV 450. In the illustrated example, the SOV 450 is operatively coupled to (e.g., in electrical communication with) the REU 410, which selectively positions the SOV 450 in one of the first or second control port positions 464, 466. In such examples, the REU 410 energizes and/or commands the SOV 450 to move from the second control port position 466 into the first control port position 464 over the bias generated by the second bias spring 468. In some examples, the REU 410 can de-energize the SOV 450 in response to detecting and/or determining that a difference between an electrical signal from the LVDT 462 of the EHSV 448 and a calculated position of the EHSV 448 exceeds a threshold (e.g., a predetermined threshold), as can occur in the case of a run-away and/or improperly functioning actuator, for example.

In the illustrated example, the MSV 452 is a two-position valve having control ports that are movable and/or actuatable between an example first control port position 470 (e.g., an active flow position) and an example second control port position 472 (e.g., a bypassed flow position). The example MSV 452 includes and/or is coupled to an example third bias spring 474, which biases the MSV 452 into and/or toward the second control port position 472 of the MSV 452. In the illustrated example, the MSV 452 is operatively coupled to (e.g., in fluid communication with) the SOV 450. In turn, the SOV 450 selectively positions the MSV 452 in one of the first or second control port positions 470, 472 of the MSV 452. For example, the SOV 450 can supply pressurized hydraulic fluid to the MSV 452 to move the MSV 452 from the second control port position 472 into the first control port position 470 based on the bias generated by the third bias spring 474.

When the MSV 452 of the illustrated example is positioned in the second control port position 472 (e.g., the bypassed flow position), pressurized hydraulic fluid freely passes through the MSV 452 of the hydraulic module 408 and, in turn, into the hydraulic motor 402. Accordingly, the unrestricted exchange and/or bypass of pressurized hydraulic fluid enables the piston 428 to be freely movable. In particular, the position of the piston 428 and/or the position of a control surface to which the piston 428 is coupled is/are accordingly freely movable when the MSV 452 of the hydraulic module 408 is in the second control port position 472 (e.g., the bypassed flow position).

The first operational mode corresponds to an active mode of operation of the hydraulic module 408, in which the hydraulic system 318 is operating according to normal and/or intended conditions. When the hydraulic module 408 is in the first operational mode, pressurized hydraulic fluid (e.g., pressurized hydraulic fluid generated by the hydraulic system 318) is supplied from the hydraulic system 318 to the hydraulic module 408 via the supply line 414 and, in turn, to the hydraulic motor 402. In some examples, when the hydraulic system 318 malfunctions, the switch 420 is activated to supply electricity to the electric motor 404, which operates the actuator 302 to maintain operation of a control surface.

Figure 4C:
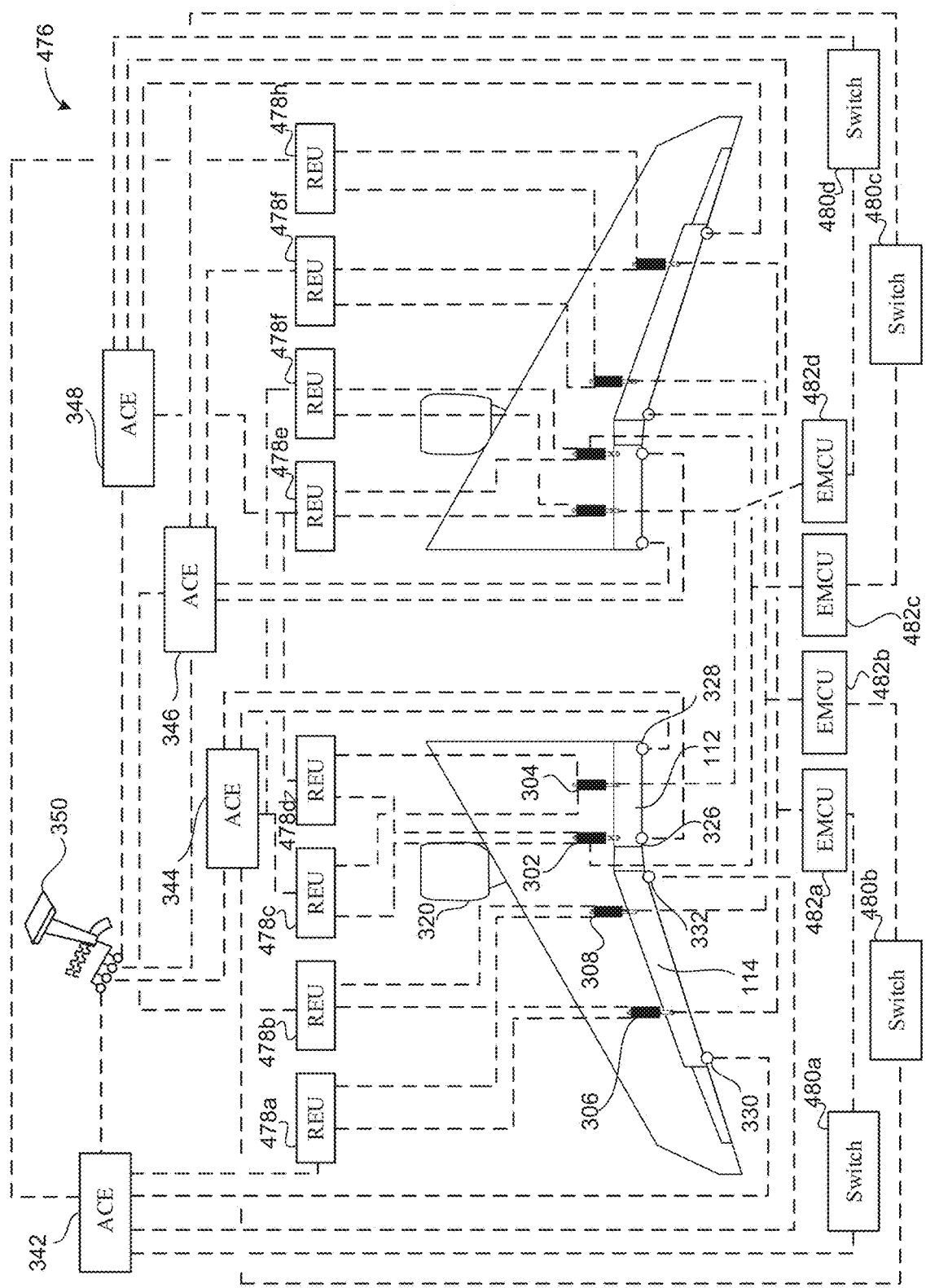
FIG. 4C is a schematic overview of another example control surface actuation system constructed in accordance with teachings of this disclosure.

FIG. 4C is a schematic overview of another example control surface actuation system 476 constructed in accordance with teachings of this disclosure. The example control surface actuation system 476 of FIG. 4C can be implemented in the example aircraft 100 of FIG. 1 described above. In the illustrated example of FIG. 4C, the control surface actuation system 476 operates in a similar manner as the control surface actuation system 300 of FIG. 3. However, in contrast to the control surface actuation system 300 of FIG. 3, the control surface actuation system 476 includes a plurality of REUs 478*a-h*, a plurality of switches 480*a-d*, and a plurality of EMCUs 482*a-d*. The plurality of REUs 478*a-h*, the plurality of switches 480*a-d*, and the plurality of EMCUs 482*a-d* create a redundant system to ensure that the actuators 302, 304, 306, 308 are operable during a period of inoperability of either the electrical system 324, the hydraulic system 318, a mechanical malfunction of one of the actuators 302, 304, 306, 308, or a period of inoperability of a redundant REU 478*a-h*. For example, the fourth actuator 308 is operable by the REU 478*a* via the first ACE 342. In an event either the first ACE 342 and/or the REU 478 become inoperable, the fourth actuator can be operable by the REU 478*b* via the third ACE 346. Further, if the there is a loss of the hydraulic system 318, the fourth actuator 308 is operable by the EMCU 482*b* which is activated by switch 480*b* via the second ACE 344. As such, the example control surface actuation system 476 defines a redundant system to ensure operability of the actuators 302, 304, 306, 308 during a period of inoperability of a portion of the aircraft 100.

FIG. 5 is a detailed view of a portion of the example actuator 302 of the control surface actuation system 300 of FIG. 3. In the illustrated example, the hydraulic motor 402 is powered by the hydraulic system 318 and moves a sun gear 500 to rotate the output gear 440 and, in turn, the gear 436 to operate the actuator 302 (e.g., move the screw 434). However, when the hydraulic system 318 is inoperable, in the illustrated example of FIG. 4B, the ACE 342 activates the switch 420 to selectively couple the electrical system 324 to the electric motor 404, for example, or enable the electrical system 324 to control the electric motor 404. In such examples, the electric motor 404 is activated and drives the ring gear 444 to rotate the output gear 440 and the gear 436 to move the actuator 302 (e.g., move the screw 434). As such, the example control surfaces (e.g., flaps 112, 114) are able to maintain operation with the electrical system 324 when the hydraulic system 318 is inoperable. Conversely, in some examples, the ring gear 444 is operational to transition the actuator 302 from electrical operation to hydraulic operation.

While an example manner of implementing the example control surface actuation system 300 is illustrated in FIG. 3, one or more of the elements, processes and/or devices illustrated in FIG. 3 may be combined, divided, re-arranged, omitted, eliminated and/or implemented in any other way. Further, the example first ACE 342, the example second ACE 344, the example third ACE 346, the example fourth ACE 348, the example REU 410, the example EMCU 412, more generally, the example control surface actuation system 300 of FIG. 3 may be implemented by hardware, software, firmware and/or any combination of hardware, software and/or firmware. Thus, for example, any of the example first ACE 342, the example second ACE 344, the example third ACE 346, the example fourth ACE 348, the example REU 410, the example EMCU 412 and/or, more generally, the example control surface actuation system 300 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first ACE 342, the example second ACE 344, the example third ACE 346, the example fourth ACE 348, the example REU 410, and/or the example EMCU 412 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control surface actuation system 300 of FIG. 3 may include one or more elements, processes and/or devices in addition to, or instead of, those illustrated in FIGS. 3 and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example control surface actuation system 300 of FIG. 3 are shown in FIGS. 6A-6E. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 6A-6E, many other methods of implementing the example control surface actuation system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6A-6E may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 6A-6E are flowcharts representative of an example method 600 for implementing the example control surface actuation system 300 of FIGS. 3-5 to control the position of a control surface (e.g., the flap 112, the flap 114). The example method 600 of FIGS. 6A-6E begins with a determination of whether all actuators are powered by a hydraulic system to cause movement of the control surface in accordance with a position of a flap lever (block 602). For example, the first ACE 342 may determine that the actuators are powered by the hydraulic system 318 in accordance with a position of the flap lever 350. Following block 602, the method 600 of FIGS. 6A-6E proceeds to block 604.

The example method 600 includes monitoring the health of the control surface actuation system 300 (block 604). For example, the first ACE 342 may monitor the health of the first actuator 302, the second actuator 304, and/or the hydraulic system 318 to determine that the control surface actuation system 300 is functioning properly, or whether the first actuator 302, the second actuator 304, or the hydraulic system 318 are malfunctioning.

If the first ACE 342 determines that a redundant ACE has malfunctioned (block 606) while monitoring the health of the control surface actuation system 300, the method 600 proceeds to block 616. If the first ACE 342 determines that an actuator mechanical malfunction has occurred (block 608) while monitoring the health of the control surface actuation system 300, the method 600 proceeds to block 622. If the first ACE 342 determines that a malfunction in the hydraulic module has occurred (block 610) while monitoring the health of the control surface actuation system 300, the method 600 proceeds to block 630. If the first ACE 342 determines that a loss of the aircraft hydraulic system has occurred (block 612) while monitoring the health of the control surface actuation system 300, the method 600 proceeds to block 638.

Figure 6A:
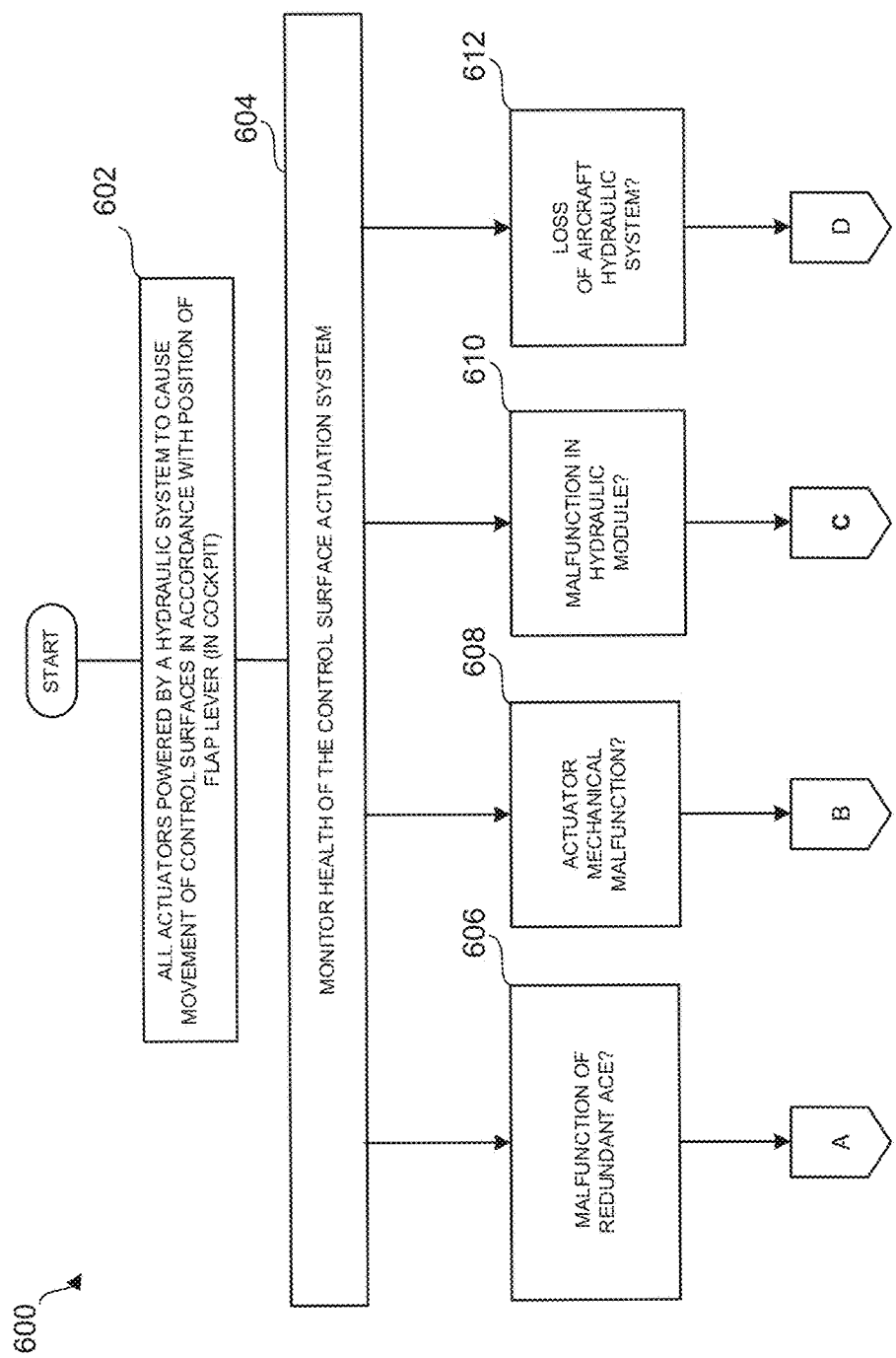
FIGS. 6A-6E are flowcharts representative of machine readable instructions which may be executed to implement the example control surface actuation system of FIG. 3.
Figure 6B:
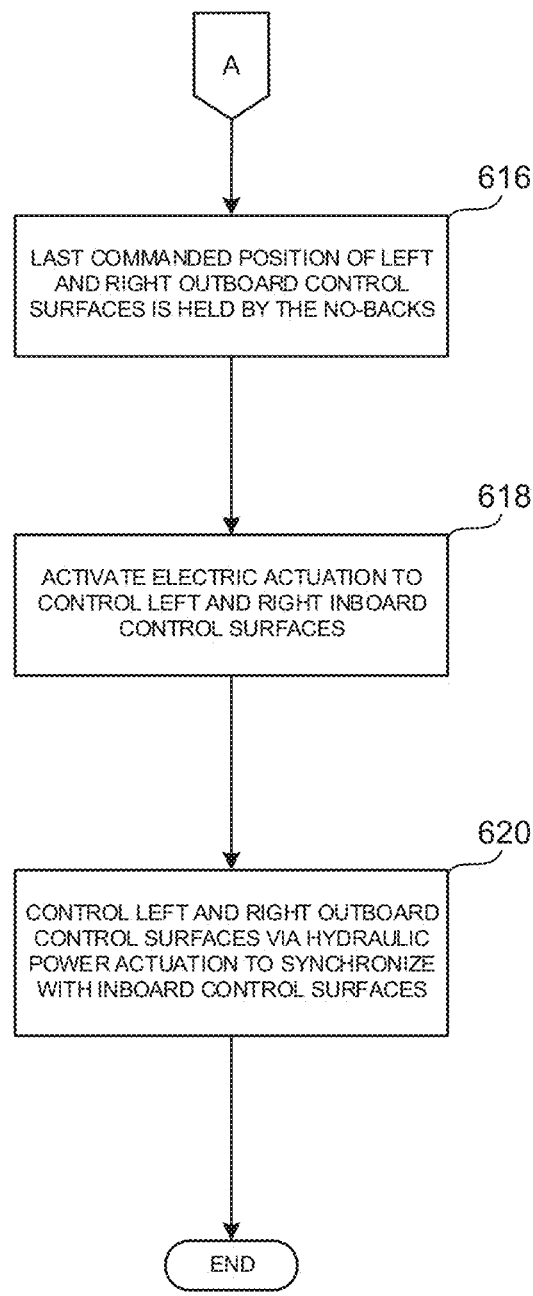

Turning to FIG. 6B, at block 616, the last commanded position of left and right outboard control surfaces is held (e.g., instantly held) by the no-backs. For example, the no-back 446 maintains the position of the screw 434 so that the respective control surface does not move. Following block 616, the method 600 proceeds to block 618.

At block 618, a switch is activated to activate electric actuation to control the left and right inboard control surfaces. For example, the second ACE 344 and/or the REU 410 activates the switch 420 to control the electric motor 404 via the electrical system 324 due to a malfunction of the first ACE 342. In this example, the actuators coupled to the left and right inboard control surfaces are switched to the electrical system due to the inoperability of one of the ACE(s) (e.g., the first ACE 342) associated with those actuators. Following block 618, the method 600 proceeds to block 620.

At block 620, the ACE controls the left and right outboard control surfaces via the hydraulic power actuation to synchronize with the inboard control surfaces. For example, the second ACE 344 controls the left and right outboard control surfaces via the hydraulic system 318 to synchronize with the inboard control surfaces, which are being operated via the electrical system 324, thereby enabling the aircraft 100 to maintain flight control parameters when one of the ACE(s) is inoperable. Accordingly, the method 600 ends. While the examples are described with the second ACE 344 taking over control during a malfunction of a redundant ACE, any one of the ACE(s) 342, 344, 346, 348 may take over control for another malfunctioning ACE.

Figure 6C:
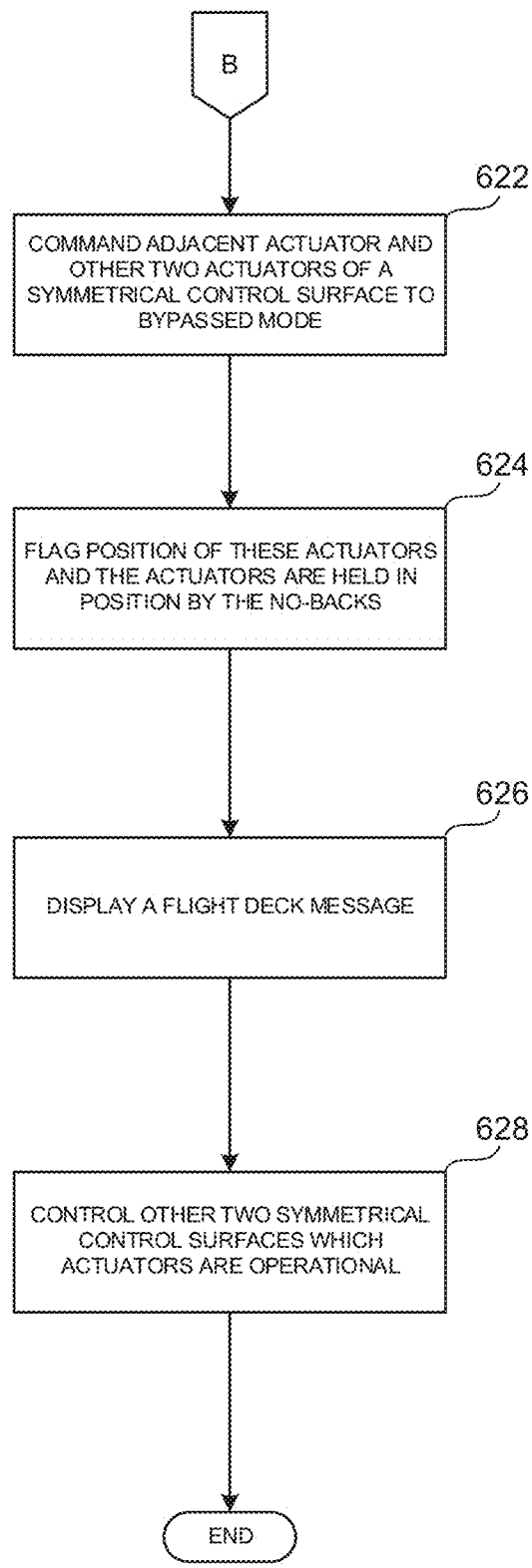

Turning to FIG. 6C, at block 622, the ACE commands adjacent actuators and the other two actuators of a symmetrical control surface to a bypassed mode. For example, if a mechanical malfunction occurs in one of the inboard control surfaces of the first wing 102, the first ACE 342 commands the adjacent actuator coupled to the inboard control surface of the first wing 102 and the two actuators coupled to the inboard control surface on the second wing 102 to the bypassed mode. Following block 622, the method proceeds to block 624.

At block 624, the ACE flags the position of the actuators and the actuators are held in position by the no-backs. For example, the first ACE 342 flags a position of the actuators and the no-back(s) 446 maintain the position of the actuators so the control surfaces do not move. Following block 624, the method proceeds to block 626.

At block 626, the ACE displays a flight deck message. For example, the first ACE 342 may display a flight deck message to the pilot indicating that there has been a malfunction of one of the actuators. Following block 626, the method 600 proceeds to block 628.

At block 628, the ACE controls the other two symmetrical control surfaces which actuators are operational. For example, if the ACE determines that the inboard control surfaces contain a mechanical malfunction, the ACE may continue to operate the actuators coupled to the outboard control surfaces of both wings without interruption. The method 600 then ends.

Figure 6D:
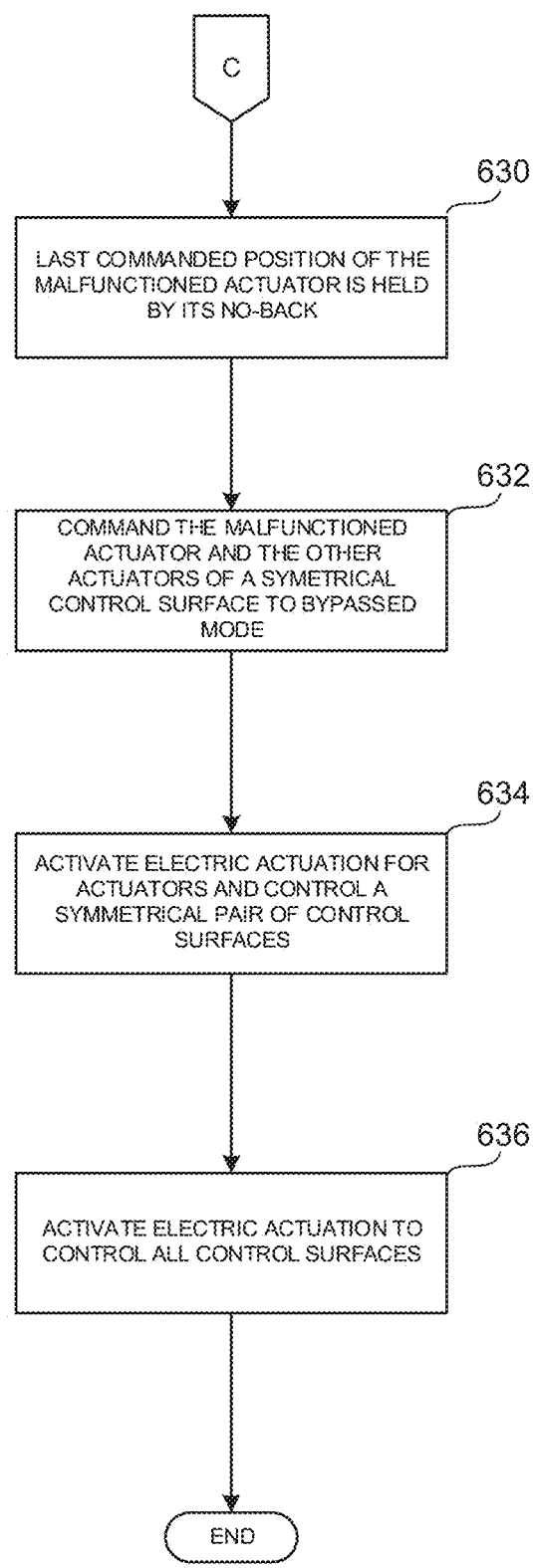

Turning to FIG. 6D, at block 630, the last commanded position of a malfunctioned actuator is held (e.g., instantly held) by the no-backs. For example, the no-back 446 maintains the position of the screw 434 so that the control surface does not move. Following block 630, the method 600 proceeds to block 632.

At block 632, the ACE commands the malfunctioned actuator and the other actuators (e.g., three of the actuators) of a symmetrical control surface to the bypassed mode. For example, if the malfunction occurs in one of the inboard control surfaces on the first wing 102, the first ACE 342 commands the adjacent actuator coupled to the inboard control surface of the first wing 102 and the two actuators coupled to the inboard control surface on the second wing 102 to the bypassed mode. Following block 632, the method proceeds to block 634.

At block 634, a switch is activated to begin electric actuation to control the actuators (e.g., four of the actuators) and control a symmetrical pair of control surfaces. For example, the first ACE 342 and/or the REU 410 activates the switch 420 to control the electric motor 404 via the electrical system 324. In this example, the actuators coupled to the left and right inboard control surfaces are switched to the electrical system due to the inoperability of one of the hydraulic modules associated with one of those actuators. Following block 634, the method 600 proceeds to block 636.

At block 636, the ACE of the illustrated example activates electric actuation to control all the control surfaces. For example, the first ACE 342 and/or the REU 410 activates the switch 420 to control the electric motor 404 via the electrical system 324 for all the actuators. The method 600 then ends.

Figure 6E:
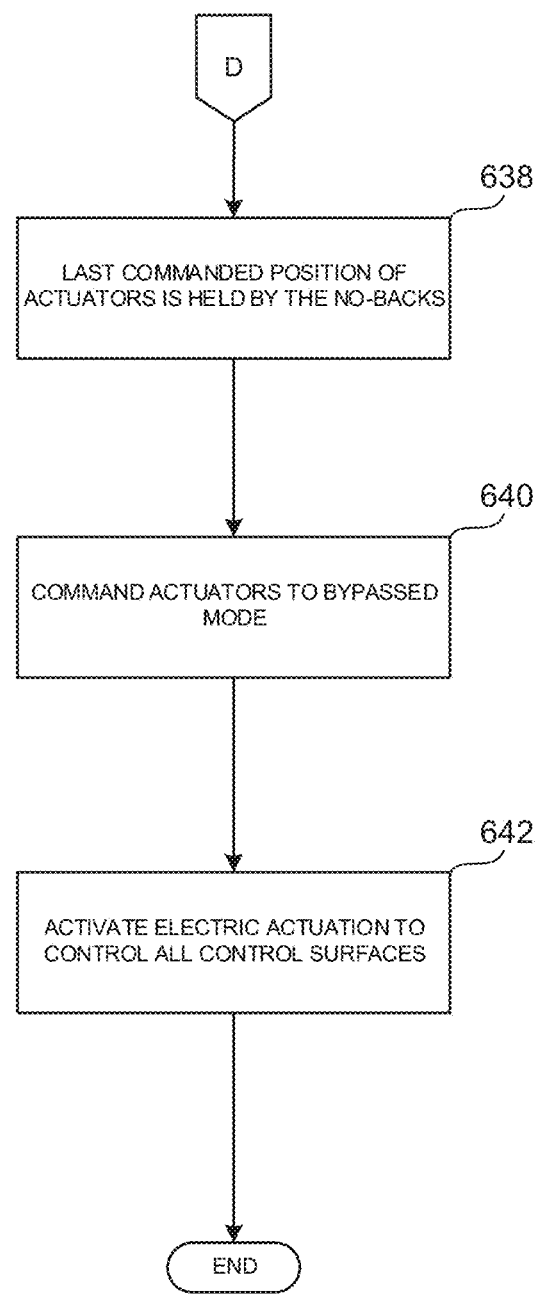

Turning to FIG. 6E, at block 638, the last commanded position of all actuators is held (e.g., instantly held) by the no-backs. For example, the no-back 446 maintains the position of the screw 434 so the control surface does not move. Following block 638, the method 600 proceeds to block 640.

At block 640, the ACE commands all the actuators to bypassed mode. For example, the first ACE 342 commands all of the actuators to bypassed mode following the malfunction of the hydraulic system 318. Following block 640, the method proceeds to block 642.

At block 642, the ACE activates electric actuation to control all the control surfaces. For example, the first ACE 342 and/or the REU 410 activates the switch 420 to control the electric motor 404 via the electrical system 324 for all the actuators and the method 600 ends.

Figure 7:
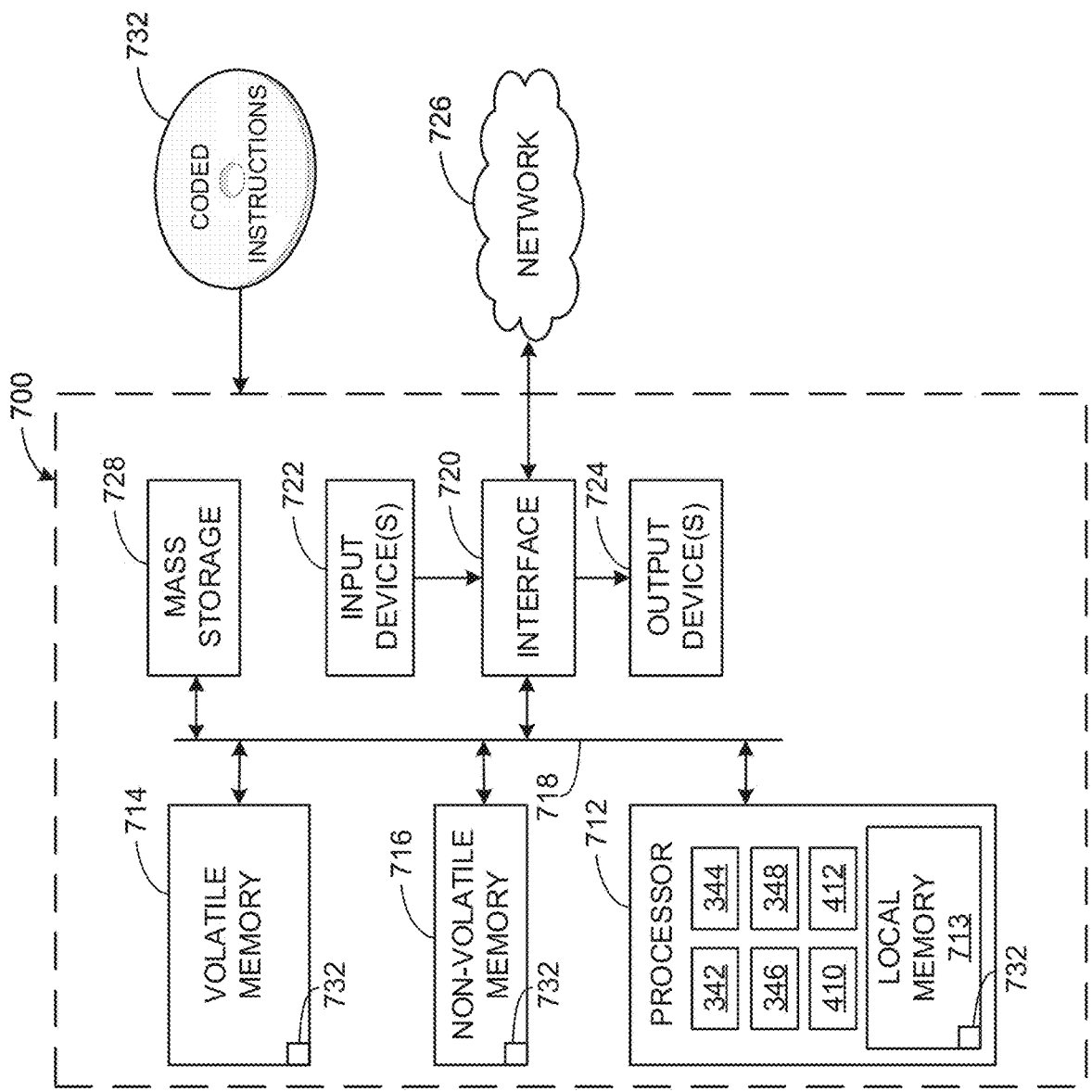
FIG. 7 is a block diagram of an example processing platform structured to execute the instructions of FIGS. 6A-6E to implement the example control surface actuation system of FIG. 3.

FIG. 7 is a block diagram of an example processor platform 700 structured to execute the instructions of FIGS. 6A-6E to implement the control surface actuation system 300 of FIG. 3. The processor platform 700 can be, for example, a server, a self-learning machine (e.g., a neural network), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example first ACE 342, the example second ACE 344, the example third ACE 346, the example fourth ACE 348, the example REU 410, the example EMCU 412 and/or, more generally, the example control surface actuation system 300 of FIG. 3

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 6A-6E may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that advantageously include a reliable system to operate an actuator(s) during inoperability of a hydraulic system, malfunction of a mechanical actuator, malfunction of a hydraulic module, and/or inoperability of an ACE.

Example methods, apparatus, systems, and articles of manufacture for redundant actuation of control surfaces are disclosed herein. Further examples and combinations thereof include the following:

Example 1 includes an apparatus comprising a control surface of an aircraft, an actuator to move the control surface, an electric motor to move the actuator, the electric motor communicatively coupled to an electrical system of the aircraft, a hydraulic motor to move the actuator, the hydraulic motor fluidly coupled to a hydraulic system of the aircraft, a sensor to detect incorrect operation of the hydraulic system, and a switch operatively coupled to the sensor, the switch to enable operation of the electric motor in response to the detected incorrect operation of the hydraulic system.

Example 2 includes the apparatus as defined in example 1, further including a second electric motor to move a portion of the switch, the second electric motor operatively coupled to the electrical system.

Example 3 includes the apparatus as defined in example 1 or example 2, wherein the electrical system is communicatively coupled to a hydraulic control system associated with the hydraulic system.

Example 4 includes the apparatus as defined in example 3, wherein the sensor is communicatively coupled to the electrical system and disposed within the hydraulic system.

Example 5 includes the apparatus as defined in any of examples 1-4, further including an electronic motor control unit communicatively coupled to the switch, the switch being actuatable between an open position and a closed position, the actuator being movable via the electric motor when the switch is in the closed position.

Example 6 includes the apparatus as defined in any of examples 1-5, further including a screw operatively coupled between the electric motor and the actuator.

Example 7 includes the apparatus as defined in example 6, further including a ring gear to operate the screw via the electric motor.

Example 8 includes the apparatus as defined in example 7, wherein the ring gear is communicatively coupled to and controlled by the electrical system.

Example 9 includes a method comprising moving a control surface of an aircraft via a hydraulic motor, the hydraulic motor fluidly coupled to a hydraulic system of the aircraft, detecting incorrect operation of the hydraulic system via a sensor, and switching, via a switch, operation of the control surface from the hydraulic motor to an electric motor in response to detecting the incorrect operation of the hydraulic system, the electric motor communicatively coupled to an electrical system of the aircraft.

Example 10 includes the method as defined in example 9, wherein the electrical system is communicatively coupled to a hydraulic control system associated with the hydraulic system.

Example 11 includes the method as defined in example 9 or example 10, wherein the sensor is communicatively coupled to the electrical system and disposed within the hydraulic system.

Example 12 includes the method as defined in any of examples 9-11, further including detecting a malfunction of a hydraulic module.

Example 13 includes the method as defined in any of examples 9-12, further including detecting a loss of hydraulic fluid in the hydraulic system.

Example 14 includes the method as defined in any of examples 9-13, further including detecting a mechanical malfunction in a first actuator, the first actuator associated with a first group of actuators, operating the first actuator and the first group of actuators via the electrical system, and operating a second group of actuators via the hydraulic system.

Example 15 includes a system having a control system coupled to an actuator, a first driver coupled to the control system to selectively drive the actuator, and a second driver coupled to the control system to selectively drive the actuator, where the control system is coupled to the first driver and the second driver and is configured to select operation of the second driver upon determination of improper operation of the first driver.

Example 16 includes the system as defined in example 15, where the control system includes a fly-by-wire control of electrical control.

Example 17 includes the system as defined in example 15 or example 16, where the first driver includes a hydraulic motor and the second driver includes an electric motor.

Example 18 includes a non-transitory computer readable medium comprising instructions, that, when executed, cause a processor to at least move a control surface of an aircraft via a hydraulic motor, the hydraulic motor fluidly coupled to a hydraulic system of the aircraft, detect incorrect operation of the hydraulic system via a sensor, and switch operation of the control surface from the hydraulic motor to an electric motor in response to detecting the incorrect operation of the hydraulic system, the electric motor communicatively coupled to an electrical system of the aircraft.

Example 19 includes the computer readable medium as defined in example 18, wherein the electrical system is communicatively coupled to a hydraulic control system associated with the hydraulic system.

Example 20 includes the computer readable medium as defined in example 18 or example 19, wherein the sensor is communicatively coupled to the electrical system and disposed within the hydraulic system.

Example 21 includes the computer readable medium as defined in any of examples 18-20, wherein the instructions when executed further cause the processor to detect a malfunction of a hydraulic module.

Example 22 includes the computer readable medium as defined in any of examples 18-21, wherein the instructions when executed, further cause the processor to detect a mechanical malfunction in a first actuator, the first actuator associated with a first group of actuators, operate the first actuator and the first group of actuators via the electrical system, and operate a second group of actuators via the hydraulic system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a control surface of an aircraft;
an actuator to move the control surface;
an electric motor to move the actuator; the electric motor communicatively coupled to an electrical system of the aircraft;
a hydraulic motor to move the actuator, the hydraulic motor fluidly coupled to a hydraulic system of the aircraft;
a sensor to detect incorrect operation of the hydraulic system; and
a switch operatively coupled to the sensor, the switch to operate the actuator in a first mode and a second mode,
wherein, in the first mode, the switch is to enable operation of the hydraulic motor and disable operation of the electric motor, and
wherein in the second mode, the switch is to disable operation of the hydraulic motor and enable operation of the electric motor in response to the detected incorrect operation of the hydraulic system.

2. The apparatus as defined in claim 1, wherein the electrical system is communicatively coupled to a hydraulic control system associated with the hydraulic system.

3. The apparatus as defined in claim 1, further including an electronic motor control unit communicatively coupled to the switch, the switch being actuatable between an open position and a closed position, the actuator being movable via the electric motor when the switch is in the closed position.

4. The apparatus as defined in claim 1, wherein the sensor is communicatively coupled to the electrical system.

5. An apparatus comprising:
a control surface of an aircraft;
an actuator to move the control surface;
an electric motor to move the actuator; the electric motor communicatively coupled to an electrical system of the aircraft;
a hydraulic motor to move the actuator, the hydraulic motor fluidly coupled to a hydraulic system of the aircraft;
a sensor to detect incorrect operation of the hydraulic system;
a switch operatively coupled to the sensor, the switch to enable operation of the electric motor in response to the detected incorrect operation of the hydraulic system; and
a second electric motor to move a portion of the switch, the second electric motor operatively coupled to the electrical system.

6. An apparatus comprising:
a control surface of an aircraft;
an actuator to move the control surface;
an electric motor to move the actuator; the electric motor communicatively coupled to an electrical system of the aircraft;
a hydraulic motor to move the actuator, the hydraulic motor fluidly coupled to a hydraulic system of the aircraft;
a sensor to detect incorrect operation of the hydraulic system; and
a switch operatively coupled to the sensor, the switch to enable operation of the electric motor in response to the detected incorrect operation of the hydraulic system, wherein the sensor is communicatively coupled to the electrical system and disposed within the hydraulic system, and wherein the electrical system is communicatively coupled to a hydraulic control system associated with the hydraulic system.

7. An apparatus comprising:
a control surface of an aircraft;
an actuator to move the control surface;
an electric motor to move the actuator; the electric motor communicatively coupled to an electrical system of the aircraft;
a hydraulic motor to move the actuator, the hydraulic motor fluidly coupled to a hydraulic system of the aircraft;
a sensor to detect incorrect operation of the hydraulic system;
a switch operatively coupled to the sensor, the switch to enable operation of the electric motor in response to the detected incorrect operation of the hydraulic system; and
a screw operatively coupled between the electric motor and the actuator.

8. The apparatus as defined in claim 7, further including a ring gear to operate the screw via the electric motor.

9. The apparatus as defined in claim 8, wherein the ring gear is communicatively coupled to and controlled by the electrical system.

10. A method comprising:
moving a control surface of an aircraft via a hydraulic motor, the hydraulic motor fluidly coupled to a hydraulic system of the aircraft;
detecting incorrect operation of the hydraulic system via a sensor; and
switching, via a switch, operation of the control surface between a first mode and a second mode,
wherein, in the first mode, the switch is to enable operation of the hydraulic motor and disable operation of an electric motor communicatively coupled to an electrical system of the aircraft, and
wherein, in the second mode, the switch is to disable operation of the hydraulic motor and enable operation of the electric motor in response to detecting the incorrect operation of the hydraulic system.

11. The method as defined in claim 10, wherein the electrical system is communicatively coupled to a hydraulic control system associated with the hydraulic system.

12. The method as defined in claim 10, further including detecting a malfunction of a hydraulic module.

13. The method as defined in claim 10, further including detecting a loss of hydraulic fluid in the hydraulic system.

14. The method as defined in claim 10, further including:
detecting a mechanical malfunction in a first actuator, the first actuator associated with a first group of actuators;
operating the first actuator and the first group of actuators via the electrical system; and operating a second group of actuators via the hydraulic system.

15. A method comprising:
moving a control surface of an aircraft via a hydraulic motor, the hydraulic motor fluidly coupled to a hydraulic system of the aircraft;
detecting incorrect operation of the hydraulic system via a sensor; and
switching, via a switch, operation of the control surface from the hydraulic motor to an electric motor in response to detecting the incorrect operation of the hydraulic system, the electric motor communicatively coupled to an electrical system of the aircraft, wherein the sensor is communicatively coupled to the electrical system and disposed within the hydraulic system.

16. A non-transitory computer readable medium comprising instructions, that, when executed, cause at least one processor to at least:
move a control surface of an aircraft via a hydraulic motor, the hydraulic motor fluidly coupled to a hydraulic system of the aircraft;
detect incorrect operation of the hydraulic system via a sensor; and
switch operation of the control surface to operate in a first mode and a second mode,
wherein, in the first mode, the switch is to enable operation of the hydraulic motor and disable operation of an electric motor communicatively coupled to an electrical system of the aircraft, and
wherein in the second mode, the switch is to disable operation of the hydraulic motor and enable operation of the electric motor in response to detecting the incorrect operation of the hydraulic system.

17. The computer readable medium as defined in claim 16, wherein the electrical system is communicatively coupled to a hydraulic control system associated with the hydraulic system.

18. The computer readable medium as defined in claim 16, wherein the instructions when executed further cause the processor to detect a malfunction of a hydraulic module.

19. The computer readable medium as defined in claim 16, wherein the instructions when executed, further cause the processor to:
detect a mechanical malfunction in a first actuator, the first actuator associated with a first group of actuators;
operate the first actuator and the first group of actuators via the electrical system; and
operate a second group of actuators via the hydraulic system.

20. A non-transitory computer readable medium comprising instructions, that, when executed, cause at least one processor to at least:
move a control surface of an aircraft via a hydraulic motor, the hydraulic motor fluidly coupled to a hydraulic system of the aircraft;
detect incorrect operation of the hydraulic system via a sensor; and
switch operation of the control surface from the hydraulic motor to an electric motor in response to detecting the incorrect operation of the hydraulic system, the electric motor communicatively coupled to an electrical system of the aircraft, wherein the sensor is communicatively coupled to the electrical system and disposed within the hydraulic system.

* * * * *